US012752783B2

(12) United States Patent
Kumazaki

(10) Patent No.: US 12,752,783 B2
(45) Date of Patent: Oct. 6, 2026

(54) VEHICLE CONTROL DEVICE FOR APPLYING A ONE PEDAL CONTROL MODE

(71) Applicant: TOYOTA JIDOSHA KABUSHIKI KAISHA, Toyota (JP)

(72) Inventor: Kenta Kumazaki, Tokyo-to (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 26 days.

(21) Appl. No.: 18/976,764

(22) Filed: Dec. 11, 2024

(65) Prior Publication Data

US 2025/0196858 A1 Jun. 19, 2025

(30) Foreign Application Priority Data

Dec. 13, 2023 (JP) ................................ 2023-210344

(51) Int. Cl.
*B60W 30/14* (2006.01)
*B60W 50/14* (2020.01)

(52) U.S. Cl.
CPC .......... *B60W 30/143* (2013.01); *B60W 50/14* (2013.01); *B60W 2552/00* (2020.02)

(58) Field of Classification Search
CPC ............... B60W 30/143; B60W 50/14; B60W 2552/00; B60W 2540/10; B60W 2540/103; B60W 2720/106
USPC ........................................................... 701/93
See application file for complete search history.

(56) References Cited

U.S. PATENT DOCUMENTS 8,666,563 B2 * 3/2014 Tokumochi ........... B60W 50/10 180/274
2011/0066342 A1 * 3/2011 Ozaki ..................... B60T 7/042 701/70
2017/0232973 A1 * 8/2017 Otake .................. B60W 30/12 701/43
2018/0015928 A1 * 1/2018 Koguchi ............... B60W 30/19
2018/0194280 A1 * 7/2018 Shibata ................ A61B 5/0205
2018/0319397 A1 * 11/2018 Ohta ................... B60W 30/143
2019/0106103 A1 4/2019 Inoue et al.
2019/0250629 A1 * 8/2019 Mizuno ................. B60W 10/02
2019/0291728 A1 * 9/2019 Shalev-Shwartz .... B60W 30/09
(Continued)

FOREIGN PATENT DOCUMENTS

DE 102021109192 A1 * 10/2021 ............. G06N 3/045
JP 2005-289368 A 10/2005
(Continued)

*Primary Examiner* — Andrew R Dyer
(74) *Attorney, Agent, or Firm* — Dinsmore & Shohl LLP

(57) ABSTRACT

The vehicle control device can apply a one pedal control mode and a speed control mode. The vehicle control device includes a processor configured to set, when the speed control mode is canceled while the one pedal control mode and the speed control mode are applied, a first absolute value of deceleration of the vehicle or a first deceleration change rate of the vehicle generated in response to an operation amount of an accelerator pedal in accordance with the one pedal control mode in a predetermined deceleration limit period from a timing when the speed control mode is canceled, to be smaller than a second absolute value of deceleration of the vehicle or a second deceleration change rate of the vehicle generated according to the same operation amount of the accelerator pedal in accordance with the one pedal control mode other than the deceleration limit period.

3 Claims, 6 Drawing Sheets

(56) References Cited

U.S. PATENT DOCUMENTS

| | | | | |
|---|---|---|---|---|
| 2020/0047762 | A1 | 2/2020 | Miyake | |
| 2021/0039504 | A1* | 2/2021 | Umetsu | B60W 10/08 |
| 2021/0039624 | A1* | 2/2021 | Umetsu | B60W 10/196 |
| 2022/0097700 | A1* | 3/2022 | Semenov | B60W 50/085 |
| 2022/0097707 | A1* | 3/2022 | Semenov | B60T 8/3215 |
| 2022/0105925 | A1* | 4/2022 | Naserian | B60W 10/184 |
| 2022/0111844 | A1* | 4/2022 | Kim | B60W 30/18109 |
| 2022/0161796 | A1* | 5/2022 | Ookawara | B60W 30/143 |
| 2022/0250621 | A1* | 8/2022 | Iba | B60W 30/165 |
| 2023/0219571 | A1* | 7/2023 | Ito | B60W 30/095<br>701/70 |
| 2023/0294719 | A1* | 9/2023 | Niu | G06V 20/58<br>74/513 |
| 2024/0182029 | A1* | 6/2024 | Naito | B60W 60/0053 |
| 2024/0262369 | A1* | 8/2024 | Ueno | B60W 40/09 |
| 2024/0400037 | A1* | 12/2024 | Mounzer | B60W 30/04 |

FOREIGN PATENT DOCUMENTS

| | | | |
|---|---|---|---|
| JP | 2005-297621 | A | 10/2005 |
| JP | 2006-175943 | A | 7/2006 |
| JP | 2009-051498 | A | 3/2009 |
| JP | 2019-064563 | A | 4/2019 |
| JP | 2020-023257 | A | 2/2020 |
| JP | 2021-024449 | A | 2/2021 |
| JP | 2021-052461 | A | 4/2021 |

* cited by examiner

VEHICLE CONTROL DEVICE FOR APPLYING A ONE PEDAL CONTROL MODE

CROSS-REFERENCE TO RELATED APPLICATIONS

This application claims priority to Japanese Patent Application No. 2023-210344 filed Dec. 13, 2023, the entire contents of which are herein incorporated by reference.

FIELD

The present disclosure relates to a vehicle control device to which a one pedal control function can be applied.

BACKGROUND

A vehicle having a so-called one pedal control function capable of accelerating and decelerating a vehicle by operating a single pedal has been proposed (see Japanese Unexamined Patent Publications JP2001-52461A).

SUMMARY

In a state where the one pedal control function is activated in a vehicle, a vehicle control mode having a function of automatically controlling the speed of the vehicle (hereinafter referred to as a speed control mode) may be applied to the vehicle. In such a case, if the driver forgets that the one pedal control function is activated, a braking force that is not intended by the driver may be generated when the speed control mode is canceled, and the vehicle may rapidly decelerate.

It is an object of the present disclosure to provide a vehicle control device that can prevent unintended rapid deceleration of a vehicle by a one pedal control function when a speed control mode is canceled.

A vehicle control device according to one embodiment can apply a one pedal control mode that can execute acceleration of a vehicle as well as deceleration of the vehicle by braking according to an operation amount of an accelerator pedal, and applying a speed control mode that automatically controls a speed of the vehicle. The vehicle control device includes a processor configured to set, when the speed control mode is canceled while the one pedal control mode and the speed control mode are applied, a first absolute value of deceleration or a first deceleration change rate of the vehicle generated in response to the operation amount of the accelerator pedal in accordance with the one pedal control mode in a predetermined deceleration limit period from a timing when the speed control mode is canceled, to be smaller than a second absolute value of deceleration or a second deceleration change rate of the vehicle generated in response to the same operation amount of the accelerator pedal in accordance with the one pedal control mode other than the deceleration limit period.

A vehicle control device according to another embodiment can apply the one pedal control mode and the speed control mode, and includes a processor configured to cancel the one pedal control mode when the speed control mode is further applied while the one pedal control mode is applied.

A vehicle control device according to still another embodiment can apply the one pedal control mode and the speed control mode, and includes a processor configured to: determine whether or not a cancellation condition for canceling the speed control mode is satisfied while the one pedal control mode and the speed control mode are applied, and notify a driver via a notification device provided in an interior of the vehicle that the one pedal control mode is being applied before the speed control mode is canceled, when the cancellation condition is satisfied.

The vehicle control device according to the present disclosure has an effect of preventing unintended rapid deceleration of a vehicle by a one pedal control function when a speed control mode is canceled.

DESCRIPTION OF EMBODIMENTS

Hereinafter, a vehicle control device, a vehicle control method executed on the vehicle control device, and a computer program for vehicle control will be described with reference to the attached drawings. The vehicle control device can apply a speed control mode and a vehicle control mode in which the one pedal control function is activated, that is, a one pedal control mode in which acceleration of a vehicle as well as deceleration by braking in accordance with an operation amount of the accelerator pedal can be executed. The vehicle control device prevents unintended rapid deceleration of the vehicle by the one pedal control mode when the speed control mode is canceled.

Figure 1:
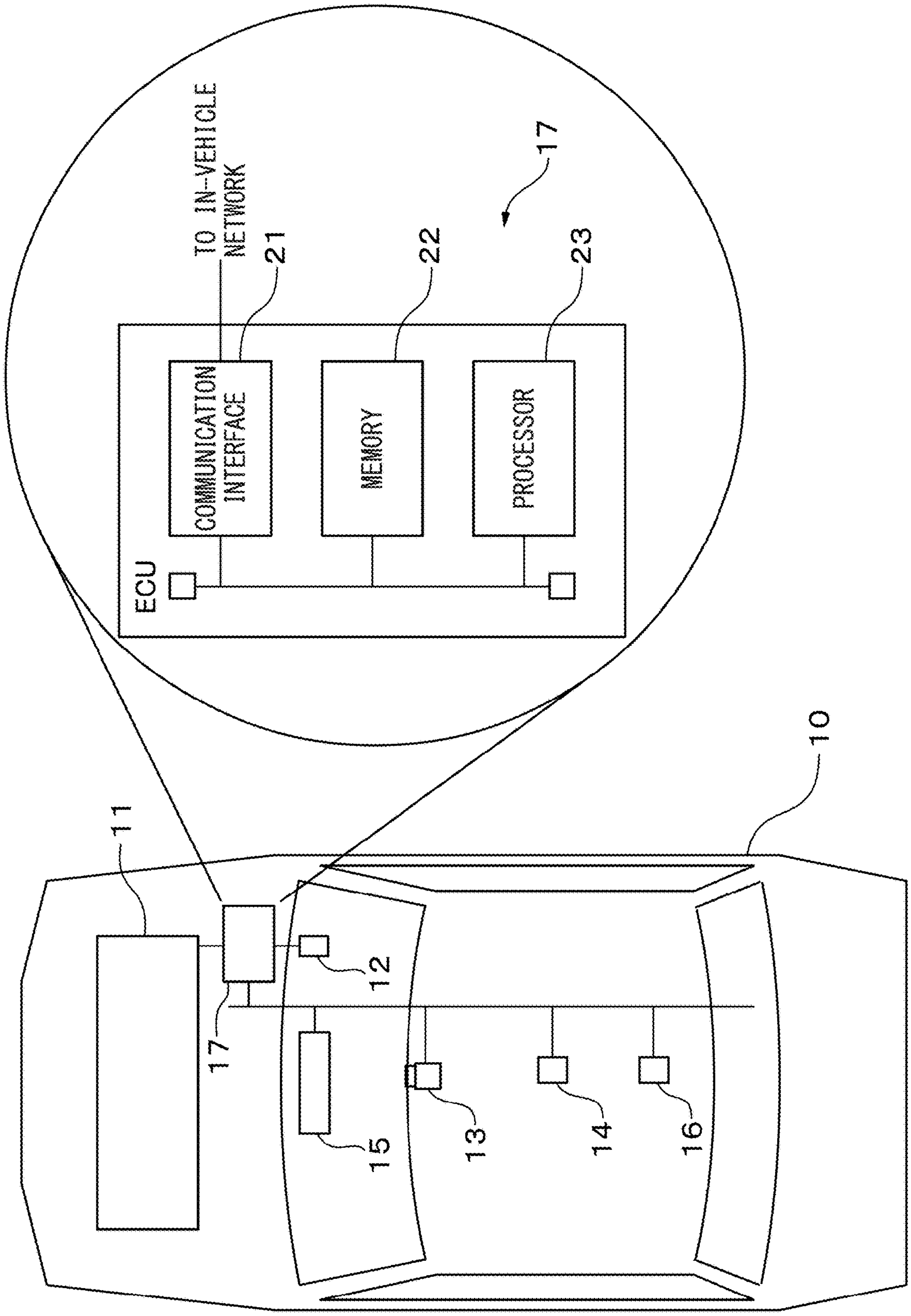
FIG. 1 schematically illustrates the configuration of a vehicle control system equipped with a vehicle control device.

FIG. 1 schematically illustrates the configuration of a vehicle control system equipped with a vehicle control device. In the present embodiment, a vehicle 10 is a Battery Electric Vehicle (BEV), hybrid type vehicle, or plug-in hybrid type vehicle, and includes a motor as a power source in a powertrain 11. In the vehicle 10, the one pedal control function using the accelerator pedal device 12 can be executed by using a regenerative braking force generated by the motor. Further, the vehicle 10 includes an external sensor 13, a GPS receiver 14, a notification device 15, a storage device 16, and an electronic control unit (ECU) 17.

The external sensor 13 is a sensor that generates an external sensor signal representing a situation around the vehicle 10, and is, for example, a camera that is provided so as to be capable of capturing an image of the surroundings of the vehicle 10, or a ranging sensor such as a LiDAR or a radar. The vehicle 10 may be provided with a plurality of external sensors 13 having different detectable ranges or types. Every time the external sensor signal is generated, the external sensor 13 outputs the generated external sensor signal to ECU 17.

The GPS receiver 14 determines the position of the vehicle 10 based on GPS signals received from GPS satellites at predetermined intervals, and outputs positioning information representing the result of determination of the position to ECU17. Note that the vehicle 10 may include a receiver that receives positioning signals from satellites by another satellite positioning system to measure the position of the vehicle 10 based on the positioning signals in place of GPS receiver.

The notification device 15 is an example of a notification unit, and is mounted in an interior of the vehicle 10. The notification device 15 includes, for example, at least one of a speaker, a light source, a vibrator, and a display device. When the notification device 15 receives a notification signal representing a predetermined notice to the driver from the ECU 17, the notification device 15 executes the notice to the driver by a voice from the speaker, lighting of the light source, vibration of the vibrator, or a message on the display. When the notification device 15 includes two or more types of devices, the notification may be made to the driver via each of the two or more types of devices.

The storage device 16, which is an example of a storage unit, includes, for example, a hard disk device, a nonvolatile semiconductor memory, or an optical recording medium and an access device thereof. Then, the storage apparatus 16 stores map information. The storage device 16 outputs the map information to the ECU 17 in response to a map read request received from the ECU 17. Note that the map information includes, for example, information that can be used in autonomous driving control or driver assistance of the vehicle 10, such as a curvature for each road section, a restricted vehicle speed, a road marking such as a lane division line, and various road markings.

The ECU 17 is an example of a vehicle control device and executes acceleration/deceleration control of the vehicle 10 according to an operation amount of the accelerator pedal device 12 by the driver while the one pedal control mode is applied. The ECU 17 also executes speed control of the vehicle 10 according to the speed control mode while the speed control mode is applied. Note that the speed control in the speed control mode may be executed as one function of the driver assistance control or as one function of the autonomous driving control.

The ECU 17 includes a communication interface 21, a memory 22, and a processor 23. The communication interface 21, the memory 22, and the processor 23 may each be configured as separate circuits or may be integrally configured as a single integrated circuit.

The communication interface 21 includes an interface circuit for connecting the ECU 17 to other devices. The communication interface 21 passes signals or information from each of the accelerator pedal device 12, the external sensor 13, the GPS receiver 14, and the storage device 16 to the processor 23. Further, the communication interface 21 outputs a control signal of the powertrain 11 received from the processor 23 to the powertrain 11. Further, the communication interface 21 outputs the notification signal received from the processor 23 to the notification device 15.

The memory 22, which is another example of a storage unit, includes a volatile semiconductor memory and a non-volatile semiconductor memory. The memory 22 stores various types of data used in the vehicle control processing executed by the processor 23 or generated during the vehicle control processing.

The processor 23 includes one or more central processing units (CPUs) and a peripheral circuit thereof. The processor 23 may further include another operating circuit, such as a logic-arithmetic unit, an arithmetic unit, or a graphics processing unit. Then, the processor 23 executes vehicle control processing on the vehicle 10.

Figure 2:
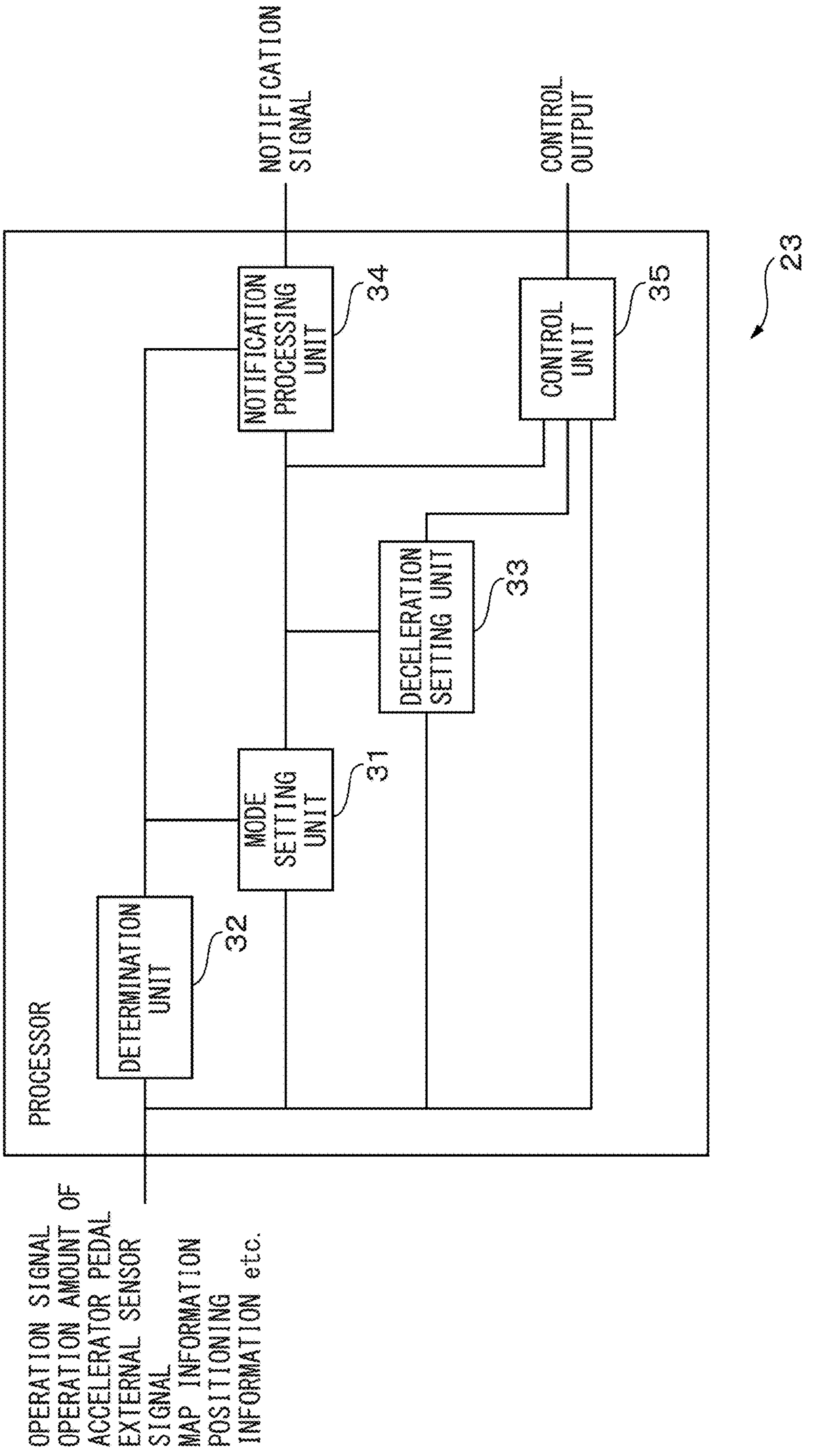
FIG. 2 is a functional block diagram of a processor of an electronic control unit, which is an embodiment of the vehicle control device.

FIG. 2 is a functional block diagram of the processor 23 related to the vehicle control processing. The processor 23 includes a mode setting unit 31, a determination unit 32, a deceleration setting unit 33, a notification processing unit 34, and a control unit 35. Each of these units included in the processor 23 is, for example, a functional module realized by a computer program running on the processor 23. Alternatively, each of these units may be a dedicated operating circuit provided in the processor 23.

First Embodiment

Processing of each unit of the processor 23 in the first embodiment will be described below. In this embodiment, when the speed control mode is canceled while both the one pedal control mode and the speed control mode are applied, the processor 23 makes the absolute value of deceleration or the change rate of deceleration according to the operation amount of the accelerator pedal device 12 in the one pedal control mode during a deceleration limit period after the cancel smaller than the absolute value of deceleration or the change rate of deceleration other than the deceleration limit period.

The mode setting unit 31 sets whether or not the one pedal control mode and the speed control mode are applied. For example, when the ECU 17 receives an operation signal indicating that the driver has performed an operation to turn on the one pedal control mode from an operation device provided in the interior of the vehicle 10 (not shown, hereinafter, simply referred to as an operation device), the mode setting unit 31 starts applying the one pedal control mode. Similarly, when the ECU 17 receives an operation signal indicating that the driver has performed an operation to turn on the speed control mode from the operation device, the mode setting unit 31 starts applying the speed control mode. Conversely, when the ECU 17 receives an operation signal indicating that the driver has performed an operation to turn off any one of the one pedal control mode and the speed control mode from the operating device, the mode setting unit 31 cancels the one of the one pedal control mode and the speed control mode. Hereinafter, for each of the one pedal control mode and the speed control mode, the cancel of the application of the control mode may be simply referred to as the cancel of the control mode.

Further, the mode setting unit 31 cancels the speed control mode when it is notified from the determination unit 32 that the condition for canceling the speed control mode is satisfied while the speed control mode is applied.

Each time one of the one pedal control mode and the speed control mode is applied or canceled, the mode setting unit 31 notifies the deceleration setting unit 33, the notification processing unit 34, and the control unit 35 of the application or cancel.

The determination unit 32 determines whether or not the cancellation condition for canceling the speed control mode is satisfied. The determination unit 32 determines that the cancellation condition is satisfied when it becomes impossible to continue the speed control of the vehicle 10 in accordance with the speed control mode. For example, when the condition of the external sensor 13 becomes bad, that is, when the external sensor 13 becomes unable to detect the situation around the vehicle 10, the determination unit 32 determines that the cancellation condition is satisfied. The bad condition of the external sensor 13 is not limited to the breakdown of the external sensor 13, and may be a temporary failure such as backlight. Therefore, when the ECU 17 receives a signal indicating that a failure has occurred from the external sensor 13, the determination unit 32 determines that the cancellation condition is satisfied. Alternatively, when the external vehicle sensor 13 is a camera, the determination unit 32 may determine that the cancellation condition is satisfied when the number of pixels having the maximum luminance value exceeds a predetermined number in the image which is generated by the external sensor 13 and is an example of the external sensor signal.

In addition, when the vehicle 10 is traveling on an automobile dedicated road and reaches a range of a predetermined distance (for example, a range of several 100 m~1 km) from a predetermined location, the determination unit 32 may determine that the cancellation condition is satisfied. The predetermined location is a location where the vehicle 10 is required to decelerate to below a predetermined velocity threshold (e.g., 20 km/h), such as a tollgate or an interchange. Alternatively, the predetermined location may be a location where the boundary of the autonomous driving controllable area and the road on which the vehicle 10 is traveling intersect. The determination unit 32 may determine whether or not the vehicle 10 has reached the predetermined distance from the predetermined location by referring to the position of the vehicle 10 determined by GPS receiver 14, a map information, a traveling direction of the vehicle 10 measured by an azimuth sensor (not shown), and a planned traveling route by a navigation device (not shown).

The determination unit 32 notifies the mode setting unit 31 of the determination result that the cancellation condition is satisfied.

When the speed control mode is not applied and the one pedal control mode is applied, the deceleration setting unit 33 sets the target acceleration/deceleration of the vehicle 10 in accordance with the operation amount of the accelerator pedal device 12. Specifically, the deceleration setting unit 33 sets the target acceleration/deceleration such that the braking force and the deceleration increase as the operation amount of the accelerator pedal device 12 decreases and the driving force and the acceleration increase as the operation amount increases. Note that the operation amount of the accelerator pedal device 12 (hereinafter, sometimes simply referred to as the operation amount) includes the accelerator opening degree. Further, the deceleration setting unit 33 sets the change rate of acceleration/deceleration until the actual acceleration/deceleration reaches the target acceleration/deceleration.

In the present embodiment, in the deceleration limit period, the deceleration setting unit 33 refers to a first acceleration/deceleration table representing the relationship between the operation amount of the accelerator pedal device 12, the target acceleration/deceleration and the change rate per unit time of the acceleration/deceleration (hereinafter, simply referred to as the change rate of acceleration/deceleration) to set the target acceleration/deceleration and the change rate of acceleration/deceleration corresponding to the operation amount. The deceleration limit period is a predetermined period (for example, 10 seconds to 1 minute) immediately after the speed control mode is canceled during applying both the speed control mode and the one pedal control mode. Further, the absolute value of deceleration when the target acceleration/deceleration set based on the first acceleration/deceleration table indicates deceleration is an example of the first absolute value, and the change rate of acceleration/deceleration is an example of the first change rate.

On the other hand, except for the deceleration limit period, the deceleration setting unit 33 refers to a second acceleration/deceleration table representing the relationship between the operation amount of the accelerator pedal device 12, the target acceleration/deceleration and the change rate of acceleration/deceleration. Then, the deceleration setting unit 33 sets the target speed/deceleration and the change rate of acceleration/deceleration corresponding to the operation amount in accordance with the second acceleration/deceleration table. The absolute value of deceleration when the target acceleration/deceleration set based on the second acceleration/deceleration table indicates deceleration is an example of the second absolute value, and the change rate of acceleration/deceleration is an example of the second change rate.

In the present embodiment, for at least one of the absolute value of the target acceleration/deceleration indicating the deceleration (that is, the target deceleration) and the change rate of deceleration, those values defined in the first acceleration/deceleration table is smaller than those values defined in the second acceleration/deceleration table with respect to the same operation amount of the accelerator pedal device 12. Therefore, when the speed control mode is canceled, occurrence of an unintended rapid deceleration by the driver in the one pedal control mode is suppressed. Hereinafter, the change rate of deceleration when the vehicle 10 decelerates may be referred to as a deceleration change rate.

The deceleration setting unit 33 notifies the control unit 35 of the target speed/deceleration and the change rate of acceleration/deceleration.

When the one pedal control mode or the speed control mode starts to be applied, the notification processing unit 34 outputs a notification signal indicating the start to the notification device 15 via the communication interface 21. Similarly, when it is notified from the mode setting unit 31 that the one pedal control mode or the speed control mode is canceled, the notification processing unit 34 outputs a notification signal indicating the cancel to the notification device 15 via the communication interface 21. Accordingly, the notification processing unit 34 notifies the driver of the application or cancel of the one pedal control mode or the speed control mode via the notification device 15.

When notifying the driver of the application of the one-pedal control mode, the notification processing unit 34 causes the speaker included in the notification device 15 to output a voice indicating the application of the one pedal control mode. Alternatively, the notification processing unit 34 causes the display device included in the notification device 15 to display a message or an icon indicating the application of the one pedal control mode. In addition, when notifying the driver of the cancel of the one pedal control mode, the notification processing unit 34 causes the speaker included in the notification device 15 to output a voice indicating the cancel of the one pedal control mode. Alternatively, the notification processing unit 34 causes the display device included in the notification device 15 to turn off the message or icon indicating the application of the one pedal control mode. When the notification device 15 includes two or more of the above-described devices, the notification processing unit 34 may notify the driver of the application or cancel of the one pedal control mode via each of the two or more devices. Furthermore, the notification processing unit 34 may notify the driver of the application or cancel of the speed control mode by executing the same processing as the notification of the application or cancel of the one pedal control mode described above. When the speed control according to the speed control mode is executed as one function of the autonomous driving control, the notification processing unit 34 further notifies the driver of the transfer of the driving control via the notification device 15 when the cancel of the speed control mode is notified.

Note that the notification processing unit 34 may notify the driver via the notification device 15 that the absolute value of the deceleration and the change rate is set to the normal value when the deceleration limit period ends.

The control unit 35 generates a control signal for generating a driving force or a braking force according to the target acceleration/deceleration and the change rate of acceleration/deceleration notified from the deceleration setting unit 33 while the speed control mode is not applied and the one pedal control mode is applied. At this time, the control unit 35 may generate the control signal in accordance with feedback control such as PID control. The control unit 35 outputs the generated control signal to the powertrain 11.

While the speed control mode is applied, the control unit 35 controls the powertrain 11 so that the vehicle 10 travels at the set target vehicle speed. In addition, the control unit 35 controls the acceleration/deceleration of the vehicle 10 so that a distance between a preceding vehicle traveling in front of the vehicle 10 and the vehicle 10 in a host lane is maintained to be equal to or more than a predetermined interval. To this end, the control unit 35 detects the preceding vehicle by inputting the external sensor signal, which is obtained by the external sensor 13 and represents the situation of the front area of the vehicle 10, to a classifier trained in advance so as to detect the preceding vehicle. Such a classifier may be based on so-called deep neural network (DNN). Further, in the case where the external sensor 13 is a camera, the control unit 35 may estimate the distance between the vehicle 10 and the preceding vehicle based on the position of the lower end of the object region in which the preceding vehicle is represented on the image which is the external sensor signal, and the parameters of the external sensor 13 such as the photographing direction, the focal length, and the installation height. In the case where the external sensor 13 is a ranging sensor, the control unit 35 may estimate the distance indicated for the region in which the preceding vehicle is represented on the ranging signal that is an external sensor signal as the distance between the vehicle 10 and the preceding vehicle. If the estimated distance to the preceding vehicle is less than the predetermined interval, the control unit 35 sets the acceleration/deceleration so as to decelerate the vehicle 10. On the other hand, if the estimated distance to the preceding vehicle is equal to or more than the predetermined interval, the control unit 35 sets the acceleration/deceleration so that the speed of the vehicle 10 approaches the target speed. The control unit 35 generates a control signal of the powertrain 11 according to the set acceleration/deceleration, and outputs the generated control signal to the powertrain 11.

Figure 3:
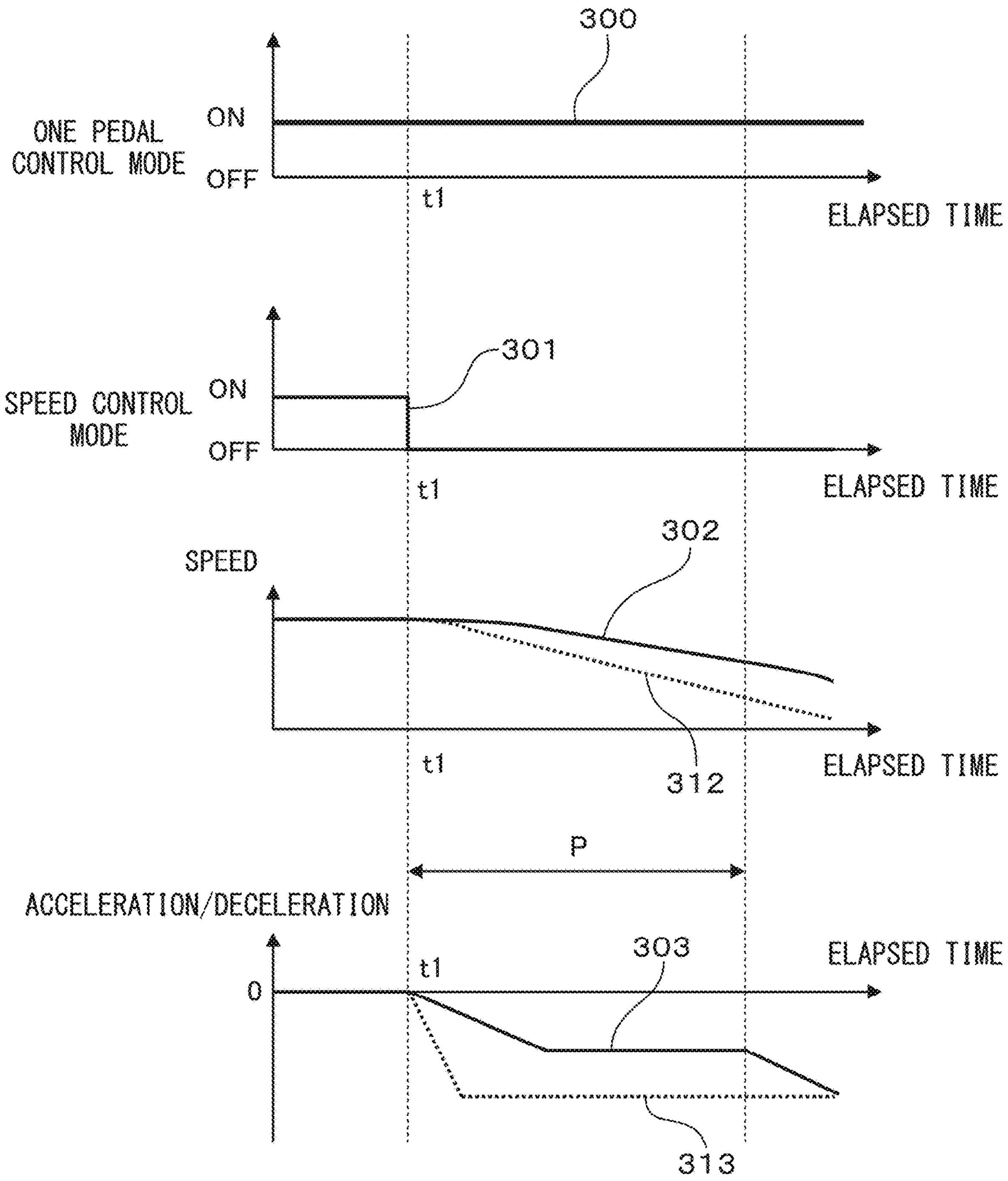
FIG. 3 is a diagram for explaining an outline of deceleration control of a vehicle based on a one pedal control mode after cancel of a speed control mode according to the first embodiment.

FIG. 3 is a diagram for explaining an outline of deceleration control of the vehicle 10 based on the one pedal control mode after cancel of the speed control mode according to the first embodiment (in this example, the target acceleration/deceleration indicates deceleration). In FIG. 3, the horizontal axis represents elapsed time. In the top chart, the graph 300 represents whether the one pedal control mode is applied over time. In the second chart from the top, the graph 301 represents whether the speed control mode is applied over time. In the third chart from the top, the graph 302 represents a temporal change in the speed of the vehicle 10 according to the present embodiment, and the graph 312 represents a temporal change in the speed of the vehicle 10 according to the comparative example in which the target deceleration is set based on the second acceleration/deceleration table regardless of whether the target deceleration is within or other than the deceleration limit period. In the bottom chart, a graph 303 represents a temporal change in deceleration of the vehicle 10 according to the present embodiment, and a graph 313 represents a temporal change in deceleration of the vehicle 10 according to a comparative example. In this embodiment, both the one pedal control mode and the speed control mode are applied until the time t1, as shown in the graph 300 and the graph 301, but the speed control mode is canceled after the time t1. Therefore, after the time t1, the target deceleration is set in accordance with the operation mount of the accelerator pedal device 12, and the speed of the vehicle 10 begins to decrease. In the comparative example, as shown in the graph 312 and the graph 313, even immediately after the speed control mode is canceled, the absolute value of the target deceleration is set to be larger than that in the present embodiment. Further, the deceleration change rate until the actual deceleration reaches the set target deceleration is also set to be larger than that in the present embodiment. Therefore, the speed of the vehicle 10 rapidly decreases immediately after the cancel of the speed control mode. On the other hand, as shown in the graph 302 and the graph 303, in the present embodiment, the absolute value of the target deceleration and the deceleration change rate are set to relatively small values in the deceleration limit period P after the time t1. Therefore, the decrease in the speed of the vehicle 10 in the deceleration limit period P becomes relatively gradual. After the deceleration limit period P has elapsed, the limit of the absolute value of the target deceleration and the deceleration change rate is canceled. Therefore, the deceleration changes until the deceleration becomes the same value as in the comparative example.

Figure 4:
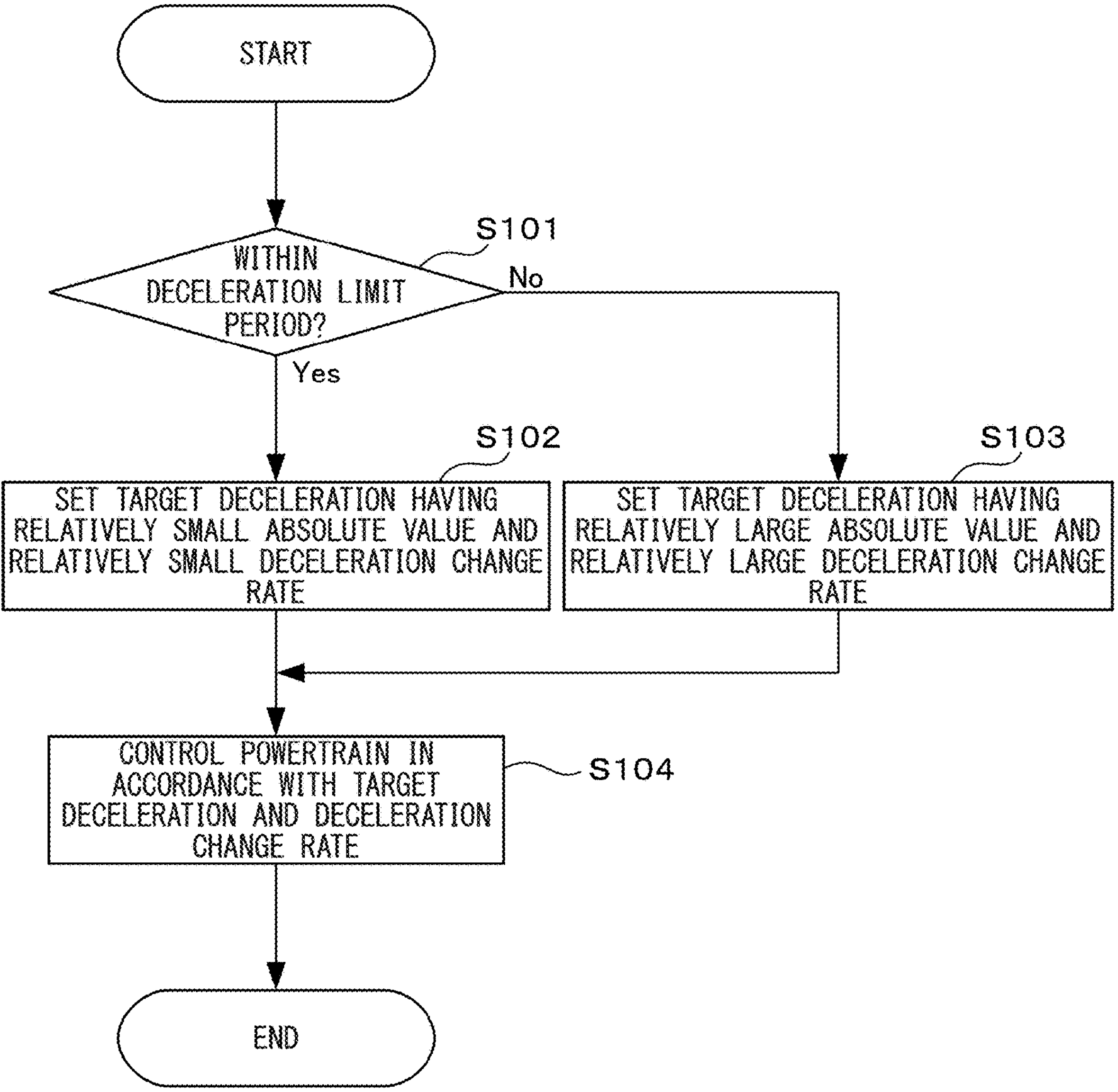
FIG. 4 is an operation flowchart of a vehicle control process according to the first embodiment.

FIG. 4 is an operation flowchart of a vehicle control process according to the first embodiment when the speed control mode is canceled in a case where both the speed control mode and the one pedal control mode are applied. This flowchart represents the vehicle control in the case where the target acceleration/deceleration at the time of canceling the speed control mode becomes a value indicating deceleration (that is, the target acceleration/deceleration becomes substantially the target deceleration). In addition, although both the absolute value of the target deceleration and the deceleration change rate are set to a relatively small value in the deceleration limit period, only one of them may be set to a relatively small value in the deceleration limit period as described above.

The deceleration setting unit 33 determines whether or not the elapsed time after the speed control mode is canceled is within the deceleration limit period (step S101). When the elapsed time is within the deceleration limit period (step S101—Yes), the deceleration setting unit 33 sets the target deceleration having a relatively small absolute value and the deceleration change rate having a relatively small value in accordance with the operation amount of the accelerator pedal device 12 (step S102). On the other hand, when the elapsed time is not included within the deceleration limit period (step S101—No), the deceleration setting unit 33 sets the target deceleration having a relatively large absolute value and the deceleration change rate having a relatively large value in accordance with the operation amount of the accelerator pedal device 12 (step S103). The control unit 35 controls the powertrain 11 of the vehicle 10 in accordance with the target deceleration and the deceleration change rate (step S104).

As described above, in the vehicle control device, the absolute value of the target deceleration or the deceleration change rate in accordance with the one pedal control mode within the deceleration limit period after the cancel of the speed control mode is made smaller than the value other than the deceleration limit period. Therefore, the vehicle control device can prevent the unintended rapid deceleration of the vehicle due to the one pedal function when the speed control mode is canceled.

According to the modification, the determination unit 32 may notify the deceleration setting unit 33 of the reason for cancel of the speed control mode (hereinafter, simply referred to as the reason for cancel) when the cancellation condition is satisfied. The deceleration setting unit 33 may set the absolute value of the target deceleration or the deceleration change rate in the deceleration limit period according to the reason for cancel. For example, in a case where the cancel reason is due to a failure of the external sensor 13, the deceleration setting unit 33 sets the absolute value of the target deceleration or the deceleration change rate in the deceleration limit period relatively smaller than in the case of the other cancel reasons. This is because, when the reason for cancel is an unexpected reason such as a failure of the external sensor 13, there is a high possibility that the driver does not want to decelerate. On the other hand, when the reason for the cancel is that the vehicle 10 reaches a predetermined place such as a tollgate, the driver can predict the cancel of the speed control mode and the deceleration of the vehicle 10. Therefore, the deceleration setting unit 33 sets the absolute value of the target deceleration or the deceleration change rate in the deceleration limit period relatively large. Even in this case, the absolute value of the target deceleration or the deceleration change rate in the deceleration limit period is smaller than those values other than the deceleration limit period.

According to another modification, the deceleration setting unit 33 may set the absolute value of the target deceleration or the deceleration change rate in accordance with the shape of the road on which the vehicle 10 is traveling or the condition of the road in the deceleration limit period. For example, in the deceleration limit period, when the road on which the vehicle 10 is traveling is a curve or the road surface is wet, the deceleration setting unit 33 may further reduce the absolute value of the target deceleration or the deceleration change rate set based on the first acceleration/deceleration table. This prevents the behavior of the vehicle 10 from becoming unstable. The deceleration setting unit 33 may determine whether or not the vehicle 10 is traveling on a curve by referring to the position of the vehicle 10 determined by GPS receiver 14 and the map information. Further, the deceleration setting unit 33 may determine that the road surface is wet when the rainfall measured by a rainfall sensor (not shown) provided in the vehicle 10 is equal to or greater than a predetermined threshold value or when the wiper is operating.

According to another modification, in the deceleration limit period, the deceleration setting unit 33 may make the absolute value of the target deceleration and the deceleration change rate when there is a succeeding vehicle following the vehicle 10 smaller than the absolute value of the target deceleration and the deceleration change rate when there is no succeeding vehicle. For example, when the succeeding vehicle is detected, the deceleration setting unit 33 corrects the absolute value of the target deceleration or the deceleration change rate set based on the first acceleration/deceleration table to further decrease. This prevents the vehicle 10 from rapidly approaching the succeeding vehicle due to the rapid deceleration of the vehicle 10. The deceleration setting unit 33 may detect the following vehicle by inputting an external sensor signal representing the situation of the rear region of the vehicle 10 obtained by the external sensor 13 to a classifier trained in advance so as to detect the succeeding vehicle. Such a classifier may be, for example, a classifier based on DNN.

Second Embodiment

Next, a second embodiment will be described. In the second embodiment, when the speed control mode starts to be applied while the one pedal control mode is applied, the one pedal control mode is canceled. Hereinafter, differences from the first embodiment will be described.

When the mode setting unit 31 receives a signal indicating that the driver applies the speed control mode from the operation device while the one pedal control mode is applied, the speed control mode is started to be applied. The mode setting unit 31 automatically cancels the one pedal control mode. The mode setting unit 31 notifies the control unit 35 that the one pedal control mode is canceled and that the speed control mode is applied.

Note that the notification processing unit 34 may notify the driver that the one pedal control mode has been canceled via the notification device 15. Alternatively, when the speed control mode is applied, the notification processing unit 34 may notify the driver of a request to cancel the one pedal control mode via the notification device 15. When a predetermined period has elapsed since the cancel request of the one pedal control mode was notified, or the ECU 17 receives a signal indicating that an operation of approving the cancel request from the operation device has been performed by the driver, the mode setting unit 31 may cancel the one pedal control mode. On the other hand, when the ECU 17 receives a signal indicating that an operation of rejecting the cancellation request of the one pedal control mode from the operation device is performed by the driver within the predetermined period after the cancel request is notified, the mode setting unit 31 may maintain the application of the one pedal control mode.

Figure 5:
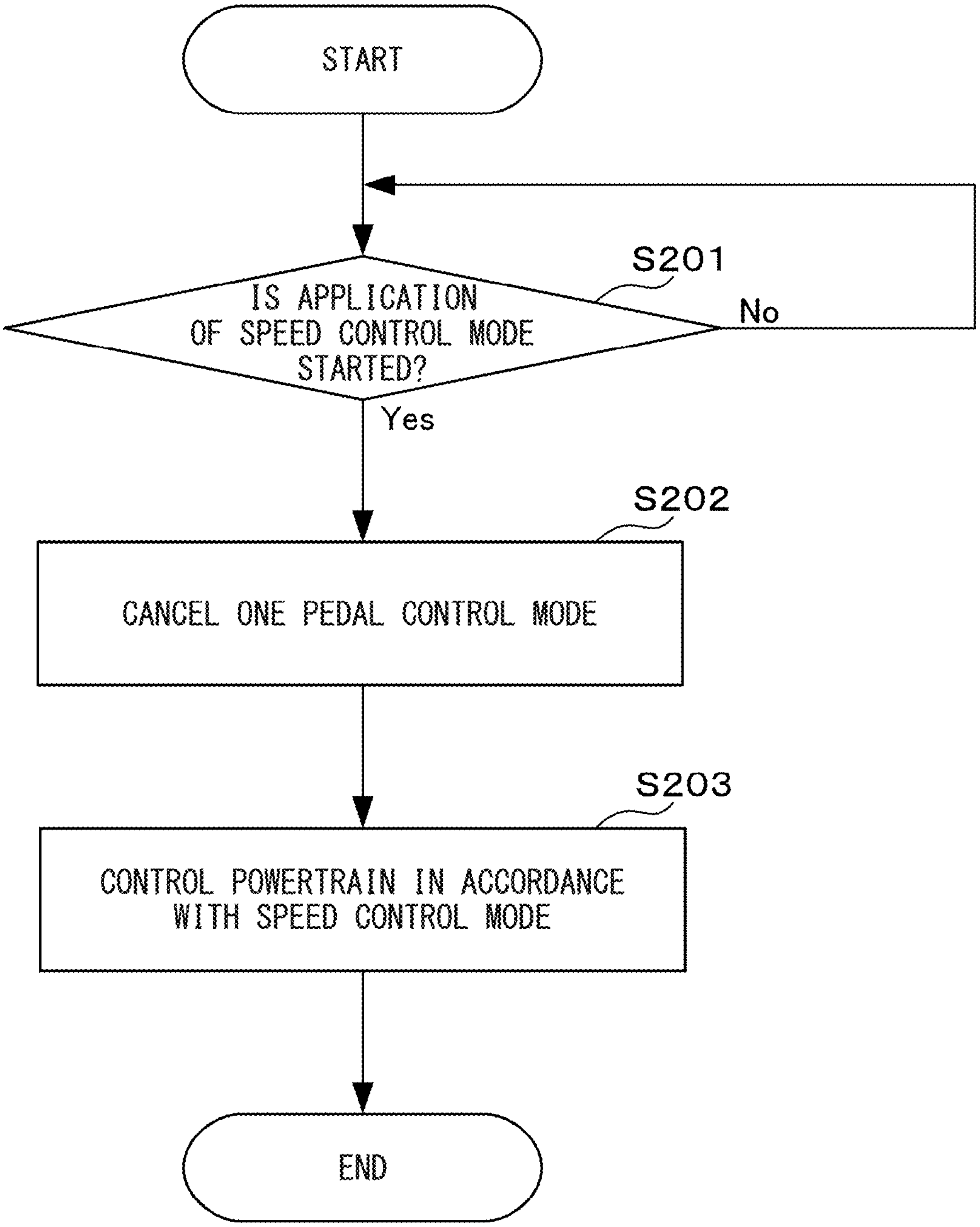
FIG. 5 is an operation flowchart of a vehicle control process according to the second embodiment.

FIG. 5 is an operation flowchart of a vehicle control process according to the second embodiment. The processor 23 may execute the vehicle control process according to the following operation flowchart when the one pedal control mode is applied.

The mode setting unit 31 determines whether or not the speed control mode starts to be applied (step S201). If the speed control mode is not started to be applied (step S201—No), the processor 23 repeats the process from step S201. On the other hand, when the speed control mode starts to be applied (step S201—Yes), the mode setting unit 31 automatically cancels the one pedal control mode (step S202). Thereafter, the control unit 35 controls the powertrain 11 in accordance with the speed control mode (step S203).

As described above, the vehicle control device according to the second embodiment cancels the one pedal control mode when the speed control mode is applied, so that it is possible to prevent the unintended rapid deceleration of the vehicle by the one pedal control function from occurring at the time of canceling the speed control mode.

Third Embodiment

Next, a third embodiment will be described. In the third embodiment, when the cancellation condition of the speed control mode is satisfied while both the one pedal control mode and the speed control mode are applied, the driver is notified that the one pedal control mode is being applied. Hereinafter, differences from the first embodiment will be described.

When the cancellation condition is satisfied, the determination unit 32 notifies not only the mode setting unit 31 but also the notification processing unit 34 of this. When the cancellation condition is satisfied and the one pedal control mode is applied, the notification processing unit 34 notifies the driver not only that the speed control mode is canceled but also that the one pedal control mode is being applied via the notification device 15.

Note that the notification processing unit 34 may notify that the one pedal control mode is being applied before the speed control mode is actually canceled. In addition, the notification processing unit 34 may notify that the one pedal control mode is being applied a plurality of times. For example, in a case where the speed control in accordance with the speed control mode is executed as one function of the autonomous driving control, the notification processing unit 34 may notify the driver that the one pedal control mode is being applied together with the pre notification and the notification of transition demand for the driving control. Furthermore, the notification processing unit 34 may set the intensity of each notification to be the same, or may increase the intensity of the notification as it approaches the cancel timing of the speed control mode. For example, the notification processing unit 34 increases the volume of the sound which is output from the speaker included in the notification device 15 and indicates that the one pedal control mode is being applied as it approaches the cancel timing of the speed control mode. In addition, the notification processing unit 34 may increase the blinking speed of the message or icon displayed on the display device of the notification device 15 while the one pedal control mode is being applied, as it approaches the cancel timing of the speed control mode.

Note that the deceleration setting unit 33 may set the absolute value of the target deceleration or the deceleration change rate to be relatively small in the deceleration limit period after the speed control mode is canceled, as in the first embodiment. Alternatively, the deceleration setting unit 33 may set the target deceleration and the deceleration change rate within the deceleration limit period in the same manner as other than the deceleration limit period.

Figure 6:
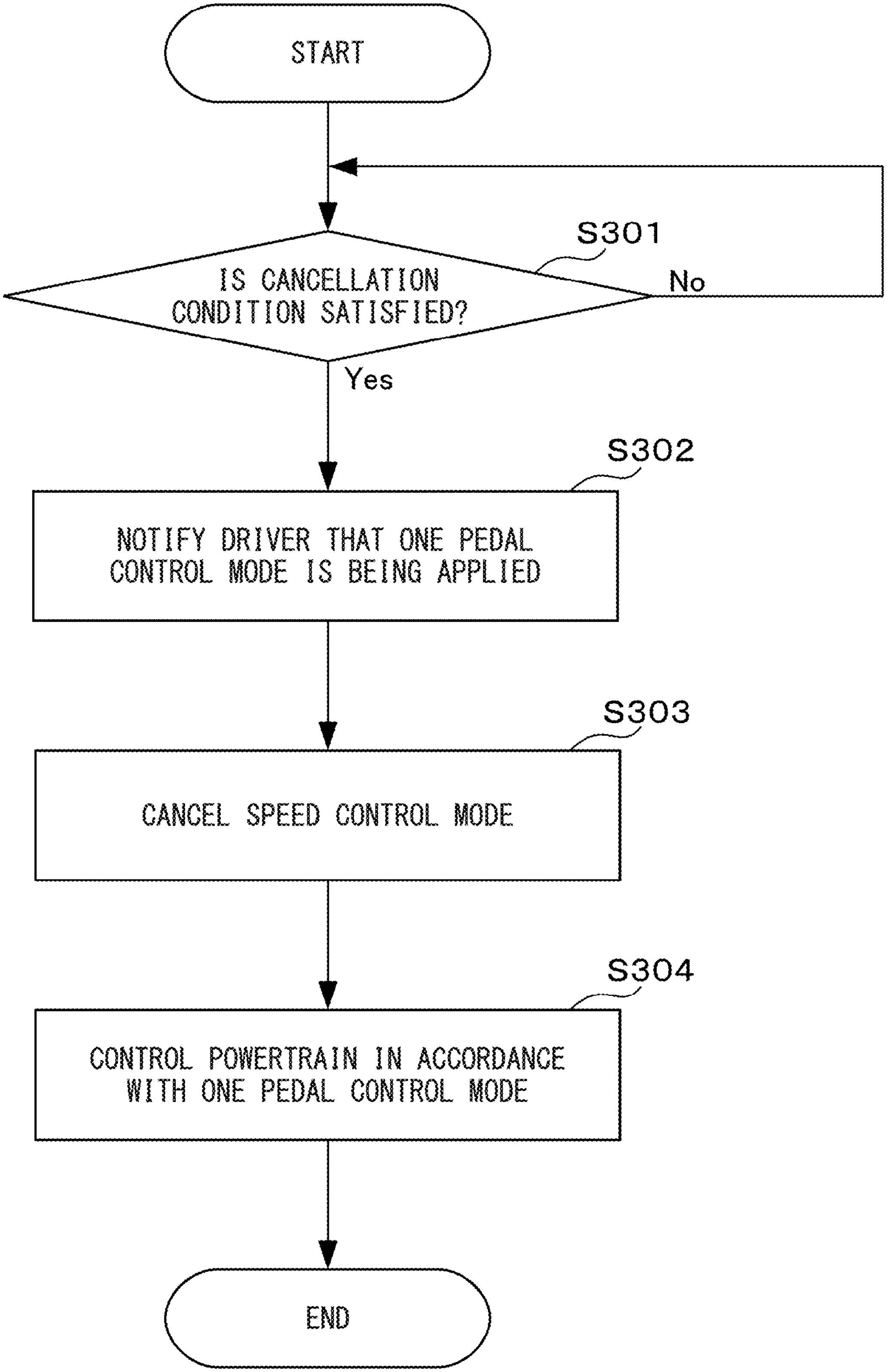
FIG. 6 is an operation flowchart of a vehicle control process according to the third embodiment.

FIG. 6 is an operation flowchart of a vehicle control process according to the third embodiment. When the one pedal control mode and the speed control mode are applied, the processor 23 may execute the vehicle control process according to the following operation flowchart.

The determination unit 32 determines whether or not the cancellation condition of the speed control mode is satisfied (step S301). If the cancellation condition is not satisfied (step S301—No), the processor 23 continues the vehicle control according to the speed control mode and repeats the processes of step S301. On the other hand, when the cancellation condition is satisfied (step S301—Yes), the notification processor 34 notifies the driver that the one pedal control mode is being applied via the notification device 15 (step S302). Thereafter, the mode setting unit 31 cancels the speed control mode (step S303). Thereafter, the control unit 35 controls the powertrain 11 in accordance with the one pedal control mode (step S304).

As described above, in the third embodiment, the driver is notified that the one pedal control mode is being applied before the speed control mode is canceled. Therefore, the vehicle control device can prevent an unintended rapid deceleration of the vehicle caused by the one pedal control function.

The computer program for realizing the functions of the processor 23 of the ECU 17 according to the above-described embodiments or modifications may be provided in a form recorded on a computer-readable portable recording medium such as a semiconductor memory, a magnetic recording medium, or an optical recording medium.

What is claimed is:

1. A vehicle control device comprising a processor configured to:

apply a one pedal control mode that can execute acceleration of a vehicle as well as deceleration of the vehicle by braking according to an operation amount of an accelerator pedal, apply a speed control mode that automatically controls a speed of the vehicle, and when the speed control mode is canceled while the one pedal control mode and the speed control mode are applied:

determine whether an elapsed time from when the speed control mode is canceled is within a deceleration limit period;

upon determination that the elapsed time is within the deceleration limit period, set an absolute value of deceleration or a deceleration change rate of the vehicle generated in response to the operation amount of the accelerator pedal in accordance with the one pedal control mode to a first value; and upon determination that the elapsed time is not within the deceleration limit period, set the absolute value of deceleration or the deceleration change rate of the vehicle generated in response to the same operation amount of the accelerator pedal in accordance with the one pedal control mode to a second value larger than the first value.

2. The vehicle control device according to claim 1, wherein the processor sets the first value of the deceleration change rate or the absolute value according to a reason for canceling the speed control mode.

3. The vehicle control device according to claim 1, wherein the processor sets the first value of the deceleration change rate or the absolute value in accordance with a shape or a condition of a road on which the vehicle is traveling in the deceleration limit period.

* * * * *